United States Patent [19]

Block

[11] 4,108,268
[45] Aug. 22, 1978

[54] ACTUATOR FOR SELF-PROPELLED SWEEPER

[75] Inventor: Thomas S. Block, Muskegon, Mich.

[73] Assignee: Clarke-Gravely Corporation, Muskegon, Mich.

[21] Appl. No.: 773,701

[22] Filed: Mar. 2, 1977

[51] Int. Cl.$^2$ .............................................. B60K 23/00
[52] U.S. Cl. ................................... 180/74; 180/19 H
[58] Field of Search ............................... 180/19 H, 74

[56] References Cited

U.S. PATENT DOCUMENTS

| | | | |
|---|---|---|---|
| 2,705,859 | 4/1955 | Burg | 180/74 X |
| 2,708,484 | 5/1955 | Hoffman | 180/74 X |
| 2,751,028 | 6/1956 | Laughlin | 180/19 |
| 2,809,705 | 10/1957 | Sewell | 180/19 |
| 2,852,083 | 9/1958 | Cavanaugh | 180/19 |
| 2,893,501 | 7/1959 | Smith | 180/19 |
| 3,323,295 | 6/1967 | Cavanaugh | 56/26 |

*Primary Examiner*—Robert R. Song
*Assistant Examiner*—Donn McGiehan
*Attorney, Agent, or Firm*—Price, Heneveld, Huizenga & Cooper

[57] ABSTRACT

A drive actuator for a self-propelled sweeper is disclosed including a wheel shaft supported on the frame of the sweeper for at least limited rotation and having a ground engaging wheel rotatably mounted thereon. A powered jackshaft is rotatably mounted on a frame and carries a drive member positioned to operatively engage the ground engaging wheel when the jackshaft is moved towards the wheel. A link connects the wheel shaft to the jackshaft and an actuator including a rod shifted by a pivotable handle rotates the wheel shaft thereby moving the drive member into engagement with the ground engaging wheel through movement of the link.

18 Claims, 10 Drawing Figures

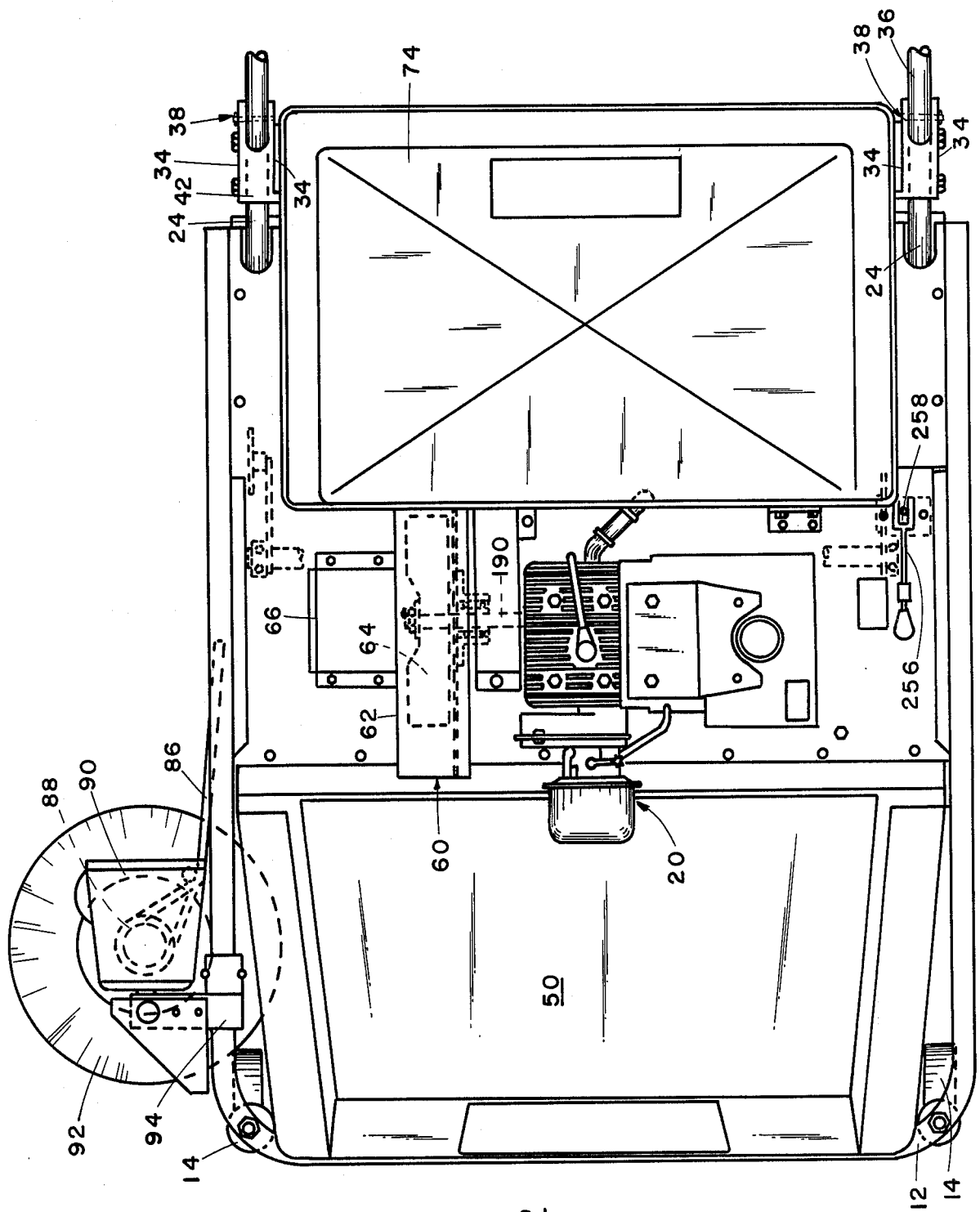

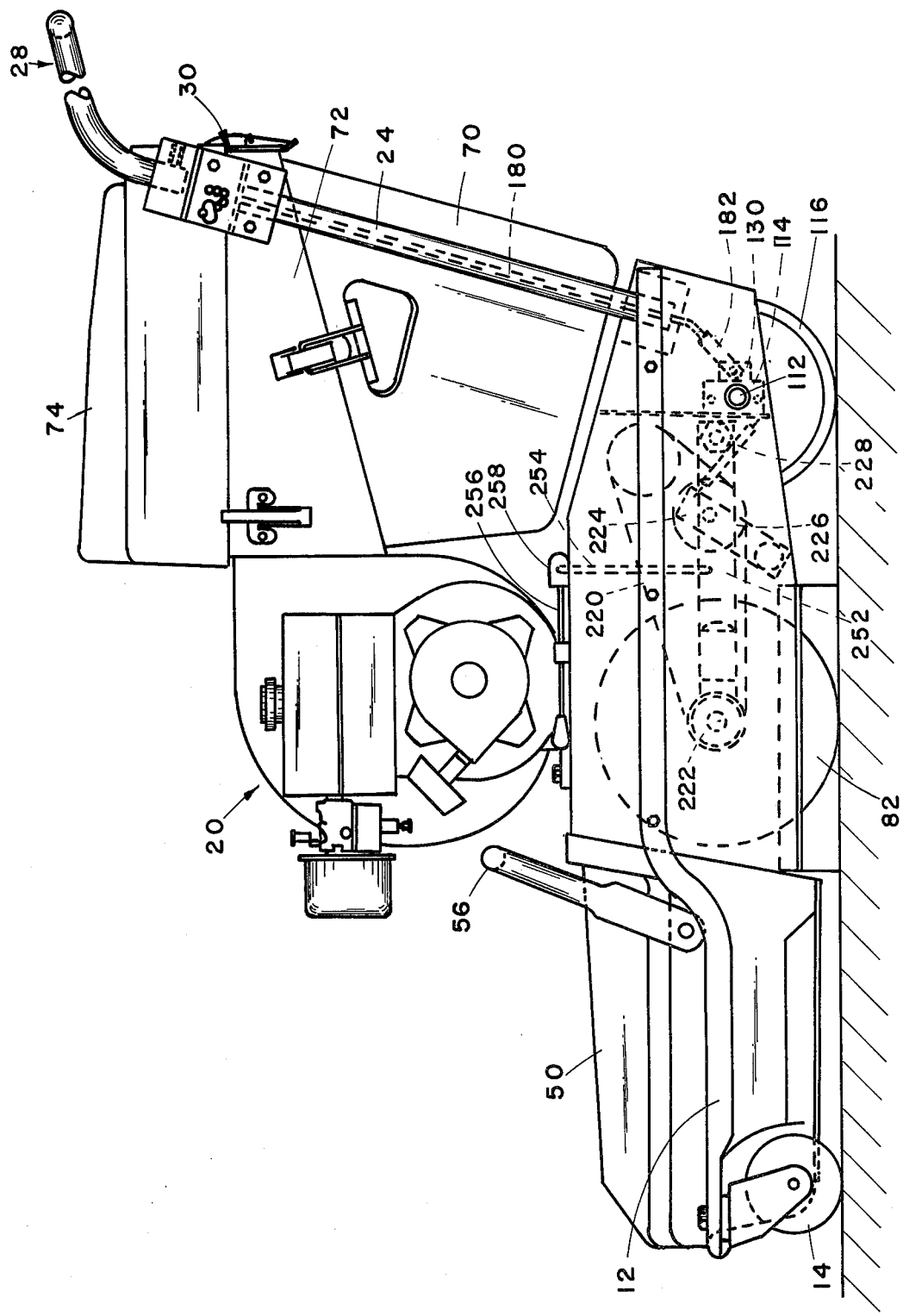

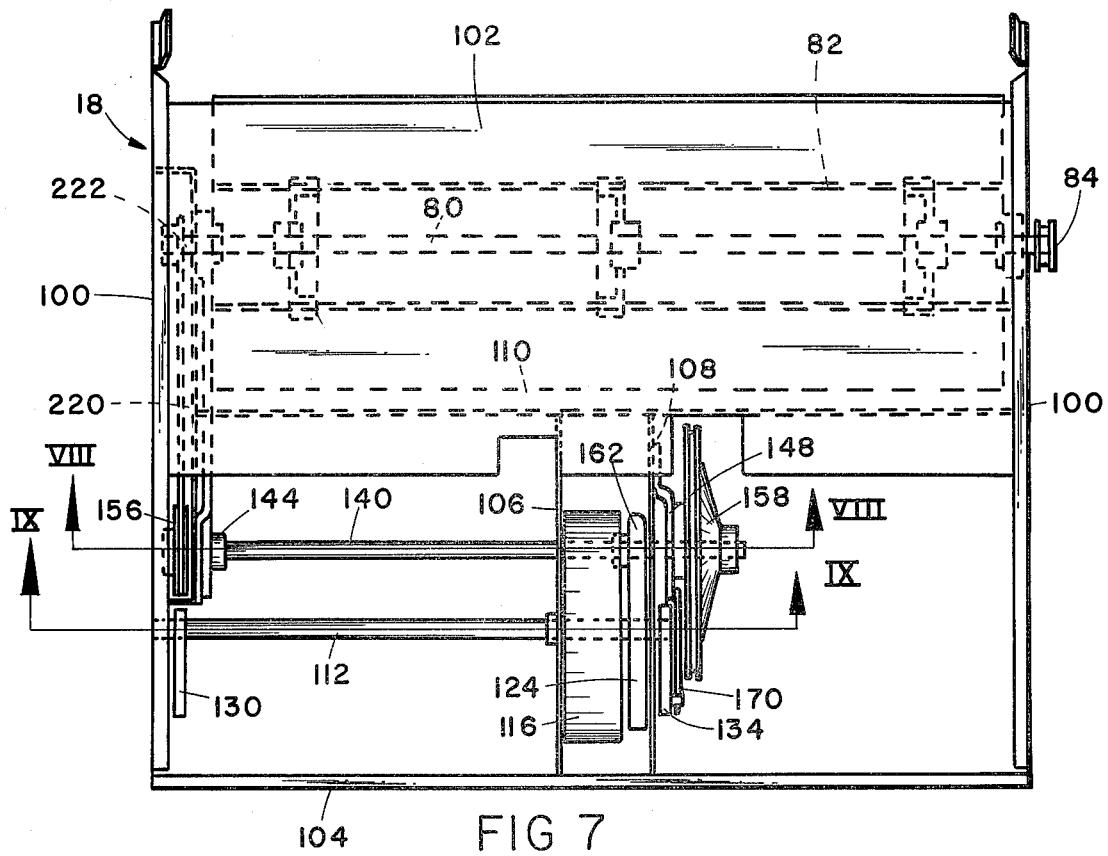
FIG 7
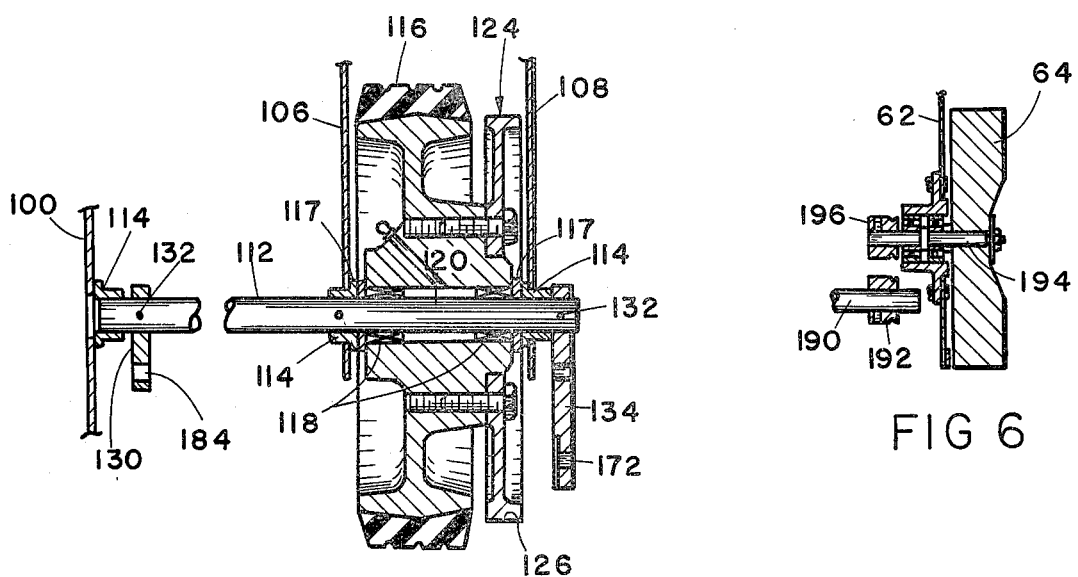
FIG 9
FIG 6

ACTUATOR FOR SELF-PROPELLED SWEEPER

BACKGROUND OF THE INVENTION

This invention relates to self-propelled apparatus and more particularly to a unique drive actuator for a self-propelled sweeper and the like.

Various forms of self-propelled apparatus such as lawn mowers, vacuum cleaners, carpet and industrial sweepers and the like are presently available. Such devices typically include an internal combustion engine or an electric motor for driving at least one ground engaging wheel as well as the operative elements of the device such as a mower blade, a sweeper brush, a blower and the like.

In order to properly control these devices, proposals have been made for selectively transmitting power from the engine or motor to the ground engaging wheel by movement of an operator's control handle. It is preferred that power be transmitted to the ground engaging wheel only when the control handle is shifted by the operator so that upon release of the control handle the machine will stop. An example of one such prior proposal may be found in U.S. Pat. No. 3,323,295 to Cavanaugh, entitled POWER LAWN MOWERS, and issued on June 6, 1967. This patent discloses a drive actuator which upon pivotal movement of a control handle, shifts a driven friction wheel mounted on a bell crank into contact with a ground engaging wheel. The driven friction wheel is rotated by a pulley and endless belt arrangement from the drive motor for the lawn mower. Another example of the prior art approaches may be found in U.S. Pat. No. 3,040,504 to Wilkin, entitled POWER LAWN MOWER AND STEERING MEANS THEREFOR, and issued on June 26, 1962. This patent is an example of the prior art constructions wherein movement of a control handle shifts an idler wheel or pulley to tension a drive belt so that power is transmitted from an engine or motor to the ground engaging wheels.

The prior art devices have suffered from various problems primarily related to complexity, reliability, durability and operational difficulties.

SUMMARY OF THE INVENTION

In accordance with the present invention, a relatively simple, reliable and easily operated drive actuator is provided wherein the operative portions are readily enclosed within the frame structure and handle of the device. Essentially, the drive actuator includes a frame, a wheel shaft supported at its end for rotational movement on the frame and having a ground engaging wheel rotatably mounted thereon. A jackshaft is supported by the frame in spaced relationship with the ground engaging wheel and for limited movement towards and away from the ground engaging wheel. Provision is made for interconnecting the jackshaft and the wheel shaft so that a drive means is operatively connected to the ground engaging wheel upon rotation of the wheel shaft. An actuator means is provided for rotating the wheel shaft upon pivotal movement of a portion of the handle which is supported by the frame.

BRIEF DESCRIPTION OF THE DRAWINGS

FIG. 2 is a top plan view of the sweeper of FIG. 1;

FIG. 3 is a left side elevation of the sweeper of FIG. 1;

FIG. 6 is an enlarged, fragmentary, cross-sectional view taken generally along line VI—VI of FIG. 1;

FIG. 7 is an enlarged, plan view of a portion of the drive actuator in accordance with the present invention;

FIG. 9 is an enlarged, fragmentary, cross-sectional view taken generally along line IX—IX of FIG. 7 with the clutch arms rotated 90°.

DETAILED DESCRIPTION OF THE PREFERRED EMBODIMENT

Figure 1:
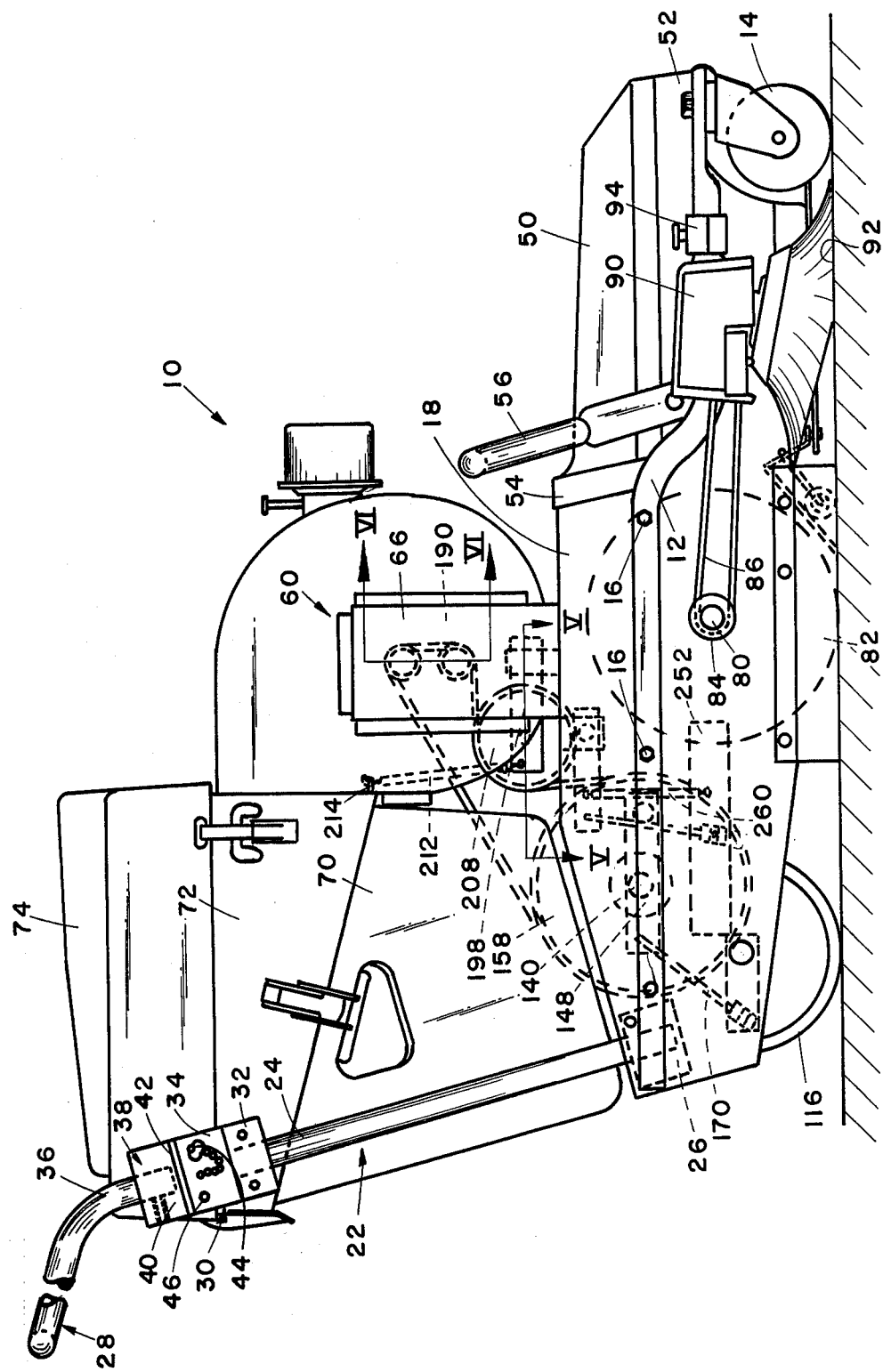
FIG. 1 is a right side elevational view of a self-propelled sweeper incorporating the unique drive actuator in accordance with the present invention.

A self-propelled sweeper incorporating the drive actuator in accordance with the present invention is illustrated in FIGS. 1, 2 and 3, and generally designated 10. The sweeper 10 includes a tubular frame 12 supporting a pair of caster wheels 14 at the front end thereof. Secured to the frame by suitable fasteners 16 is a main frame assembly or housing 18 preferably fabricated from sheet metal. Bolted or otherwise suitably secured to the top of the main frame 18 is a power unit 20. The power unit 20 is illustrated as being an internal combustion engine. It should be understood that other types of units could be employed.

Extending upwardly from the rear of the main frame 18 is a handle 22. The handle 22 includes a pair of upright, tubular legs 24 secured to the main frame 18 by a handle support bracket 26. A control member or pivotable handle portion 28 having a generally U-shaped configuration is pivotally mounted at its ends to the top of the uprights 24. The top of the upright 24 includes a handle bracket 30. The handle bracket 30 has a yoke-like configuration and includes a leg 32 and a pair of spaced, parallel, upright legs 34 defining a slot therebetween (FIG. 2). Secured to the ends 36 of the control member 28 are handle pivot brackets 38. The handle pivot brackets 38 include a main body portion 40 and a depending leg 42 dimensioned to be received within the slots defined by the legs 34 of the handle bracket 30.

A handle release pin 44 extends through the legs 34 of the lower bracket and the leg 42 of the upper bracket (FIG. 1). Another pin 46 likewise extends through the members. In the preferred form, the aperture in the depending leg 42 through which the pin 46 extends is dimensioned greater than the pin 46. The aperture in leg 42 through which the release pin 44 extends is dimensioned substantially the same as the release pin. As a result, the handle is pivotally mounted about the release pin 44, and may be moved downwardly from a first, non-operating position to a second, operating position.

In the alternative, the aperture in leg 42 through which the release pin 44 extends may have a diameter greater than that of the release pin and the pin 46 may serve as the pivot pin. In this alternative form, then, the handle will pivot about pin 46 and be moved to an operating position by upward movement of the handle 28. As more fully described below, the pivotable handle portion or operator control member 28 forms part of the "dead man" drive actuator. The removable release pin 44 permits the handle 28 to be pivoted downwardly relative to the legs 24 for storage and/or transportation purposes.

As seen in FIGS. 1, 2 and 3, supported at the forward end of the tubular frame 12 is a removable debris-receiving bin 50. The bin 50 rests at its forward end 52 on the tubular frame 12. The rear end, or open end of the bin 50, includes a peripheral flange or lip 54 that rests on the main frame or housing assembly 18. A pivotally mounted handle 56 is preferably provided for removal of the bin 50. Supported on the housing 18 adjacent the power unit 20 is a blower subassembly 60. The blower subassembly includes a housing 62 within which is rotatably mounted a centrifugal-type impeller 64. An intake duct 66 communicates the interior of the housing 18 with the inlet of the blower housing 62. As more fully described below, the impeller is driven by the power unit 20. The blower 60 discharges into a dust bin 70. The dust bin 70 is supported between the upright leg portions 24 of the handle and includes a removable cover 72 above which is mounted a filter housing 74. Conventional filters (not shown) are supported above the dust bin 70 within the filter housing 74.

Rotatably mounted within the housing 18 and extending transversely between the side members of the housing is a brush shaft 80 (FIG. 7). Non-rotatably secured to the brush shaft 80 is a sweeper brush 82. The sweeper brush 82 rotates in a counterclockwise direction when viewed in FIG. 1 and sweeps debris into the forward debris bin 50.

Secured to one side of the shaft 80 is a pulley 84 (FIG. 7). A flexible drive belt 86 is reeved around the pulley 84 and around a pulley 88 (FIG. 2) rotatably supported within a side brush housing 90. Rotation of the pulley 88 rotates a shaft upon which a side brush 92 is secured. The side brush housing 90 is supported on the tubular frame 12 by a bracket 94. A more complete description of the side brush and the side brush drive arrangement may be found in commonly owned application, Ser. No. 655,060, filed Feb. 4, 1976, in the name of Thomas Block and entitled "PUSH SWEEPER".

As seen in FIGS. 7 and 9, the housing or main frame subassembly 18 includes sidewalls 100, a top 102 covering the sweeper brush 82 and a rear wall 104. Positioned between the sidewalls 100 in spaced, parallel relationship are a pair of intermediate walls 106, 108. Extending transversely between the sidewalls 100 in spaced, parallel relationship with the rear wall 104 is an intermediate transverse wall 110. A wheel shaft 112 is rotatably supported between sidewall 100 and intermediate wall 108.

As best seen in FIG. 9, the ends of the wheel shaft 112 are rotatably mounted within support bearings 114 secured to the respective walls. A ground engaging wheel 116 is supported on a wheel shaft 112 between the intermediate walls 106, 108. The ground engaging wheel 116 is rotatably supported by a pair of bearings 118 positioned within the hub 120 of the wheel. Another cuplike bearing 114 is secured to the intermediate wall 106 and thrust washers 117 are positioned between the bearings 114 at the intermediate walls and the wheel 116. In this manner, the wheel 116 is positioned on the shaft 112, yet is freely rotatable relative to the shaft.

Secured to the hub of the wheel 116 is a friction driven wheel 124. Friction driven wheel 124 is a generally disc-shaped member having a peripheral flange 126, and in the form illustrated, is bolted directly to the hub and positioned concentric with respect to the wheel. As will become apparent, the friction driven wheel 124 forms part of a driven means transmitting power to to the ground wheel 116.

As seen in FIGS. 1, 3, 7 and 9, a pair of clutch arms are secured to the wheel shaft 112. A first lower clutch arm 130 is non-rotatably secured to the shaft 112 by a pin 132. The clutch arm 130 extends radially outwardly from the shaft and is positioned adjacent the sidewall 100. At the opposite end of the shaft 112 is positioned a second lever or clutch arm 134. The clutch arm 134 is secured to the shaft by a pin 132 and extends radially outwardly therefrom. The shaft 112 is therefore supported within the frame for at least limited rotational movement about its axis upon shifting of the clutch arms 130, 134.

Figure 8:
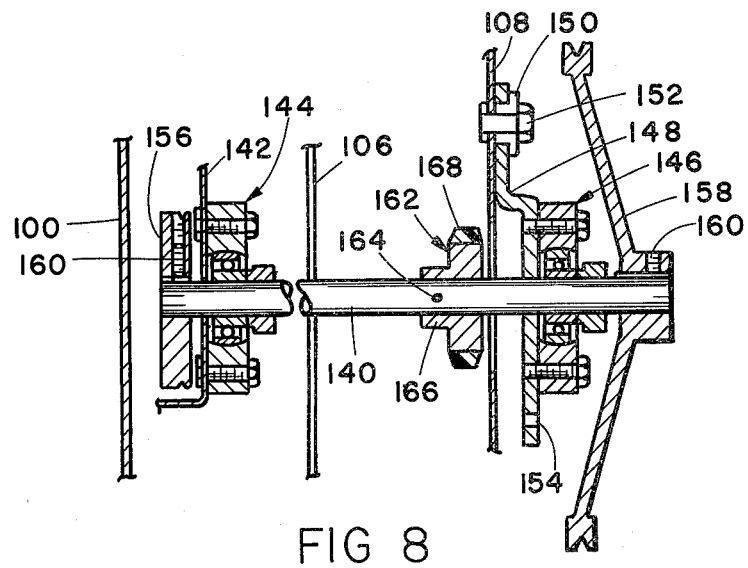
FIG. 8 is an enlarged, cross-sectional view taken generally along line VIII—VIII of FIG. 7.

A jackshaft or countershaft 140 is rotatably supported within the housing 18 between the sidewall 100 and intermediate wall 108 at a position spaced from, above and parallel with the wheel shaft 112 (FIG. 7). As best seen in FIG. 8, the jackshaft 140 is supported at one end by an intermediate wall member 142 to which is secured a bearing assembly 144. The other end of the jackshaft 140 is supported for rotational movement and limited movement towards and away from the wheel shaft 112 and hence the ground engaging wheel 116 by a bearing assembly 146 bolted to the end of an upper clutch arm or lever 148. One end of the clutch arm or lever 148 is pivotally secured to the intermediate wall 108 through a pivot bushing 150 and bolt 152. The opposite or free end of the arm 148 is provided with a link-receiving aperture 154 for reasons more fully described below.

Secured to the end of the jackshaft 140 adjacent the sidewall 100 is a brush drive pulley 156. Secured to the opposite end of the jackshaft 140 is a driven pulley 158. The brush drive pulley 156 and the driven pulley 158 are non-rotatably secured to the jackshaft by set screws 160.

Secured intermediate the ends of the jackshaft 140 and adjacent the intermediate wall 108 is a friction drive wheel 162. The friction drive wheel is non-rotatably secured to the shaft through a set screw or pin 164 at a hub portion 166. Extending around the friction drive wheel 162 is a rubber, friction wheel 168. As is apparent from FIG. 7, the friction drive wheel 162 is positioned on the jackshaft 140 in opposed relationship with the friction driven wheel 124. Movement of the jackshaft 140 towards the wheel shaft 112 permits the friction wheel 162 to frictionally engage the driven wheel 124 in a tangential fashion.

Figure 4:
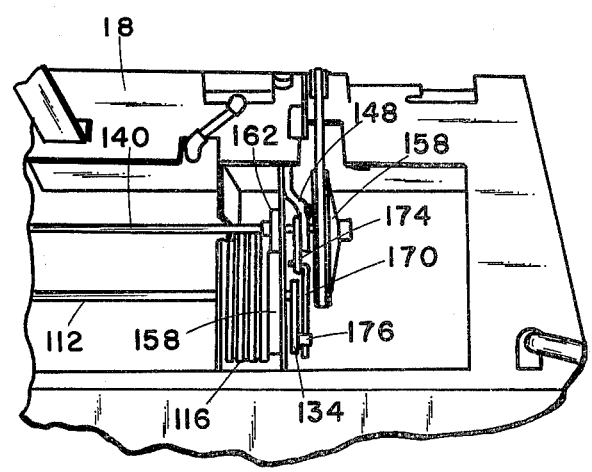
FIG. 4 is a fragmentary, rear perspective view showing a portion of the drive actuator.

As best seen in FIGS. 1, 4 and 7, a link 170 extends between the aperture 154 of the upper clutch arm 148 and an aperture 172 formed adjacent the free end of the second, lower clutch arm 134. The link, as seen in FIG. 4, may take the form of a generally L-shaped member including a leg 174 extending through the aperture 154 so as to be pivotally connected to the arm 148. The opposite end of the link may be received within a block 176 pivotally secured to the arm 134 at the aperture 172. A set screw (not shown) may be employed to secure the link 170 to the block 176. This attachment arrangment permits adjustment of the link relative to the arms 148, 134 so that rotation of the shaft 112 causes the friction drive wheel 162 to engage the friction driven wheel 124.

The shaft 112 is rotated through a rod 180, as seen in FIG. 3. The rod 180 extends upwardly within the tubular handle upright 24 and is connected at its lower end through a yoke 182 to the first lower clutch arm 130 at an aperture 184. The upper end or free end of the rod 180 extends through the leg 32 of handle bracket 30 and terminates within the slot defined by the walls 34 of the bracket. As seen in FIG. 3, pivotal movement of the control member 28 about release pin 44, as is presently preferred, will shift the rod 180 downwardly relative to the upright leg 24 of the handle. This downward shifting of the rod 180, which is pivoted at its lower end to the clutch arm 130, will rotate the wheel shaft 112 in a clockwise direction when viewed in FIG. 3. This rotation of the shaft 112 rotates clutch arm 134 and through the link 170 rotates the upper clutch arm 148. As a result, the friction drive wheel 162 will be brought into driving contact with the friction driven wheel 124 and hence rotate the ground engaging wheel 116. In the alternative, the friction drive wheel 162 could be positioned on the jackshaft 140 so as to directly engage the ground engaging wheel 116. Engagement of the drive wheel 162 with the separate driven wheel 124 is preferred, however, as this permits the driven wheel element 124 to be fabricated from a material different from that of the tire portion of the wheel 116.

Figure 10:
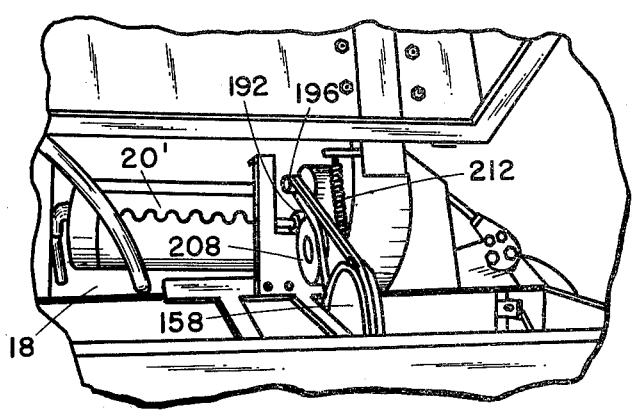
FIG. 10 is a rear, fragmentary, perspective view of a portion of the sweeper showing the drive actuator in accordance with the present invention.

The jackshaft 140 is continuously rotated during operation of the power unit 20 by a drive transmission arrangement (FIGS. 1 and 10). The power unit includes a drive or output shaft 190 (FIGS. 2 and 6). Non-rotatably secured adjacent the end of the output shaft 190 is an input pulley 192. As seen in FIGS. 2 and 6, the impeller 64 is mounted within the blower housing by a shaft 194. Non-rotatably secured to the end of the shaft 194 and positioned above the input pulley 192 is an impeller drive pulley 196.

Figure 5:
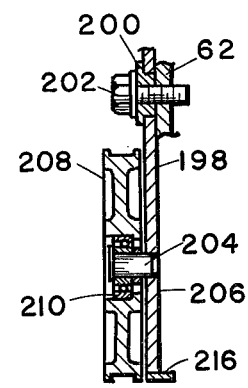
FIG. 5 is an enlarged, fragmentary, cross-sectional view taken generally along line V—V of FIG. 1.

As seen in FIGS. 1 and 5, an idler pulley arm 198 is pivotally secured to the frame 18 at the blower housing 62. The arm 198 is secured to the blower housing 62 through a bushing 200 and a bolt 202. A stub shaft 204 is press-fit within an aperture 206 formed adjacent the free end of the idler pulley arm 198. An idler pulley 208 is rotatably mounted on the stub shaft 204 by a bearing 210. As best seen in FIGS. 1 and 10, a coil spring 212 extends from a tab 214 secured to the blower housing 40 downwardly to a tab 216 at the free end of the idler arm 198. An endless drive transmission member in the form of a belt is reeved around the input pulley 192, the blower drive pulley 196 and the driven pulley 158 secured to the end of the jackshaft 140. The idler pulley 208 is biased against the drive transmission member 212 to maintain the belt in tension. The drive transmission, therefore, continuously rotates the jackshaft 140 when the power unit 20 is operating. As best seen in FIG. 3, the brush shaft 80 is continuously driven by a belt 220 reeved around the brush drive pulley 156 and the brush driven pulley 222, non-rotatably secured to the end of the brush drive shaft. A brush drive idler pulley 224, rotatably supported on a pivotable brush drive idler arm 226, maintains the belt 220 in tension. The free end of the brush drive idler pulley arm 226 is biased by a coil spring 228.

OPERATION

In view of the foregoing detailed description of the preferred embodiment of the present invention, the operation of the unique drive actuator for a self-powered apparatus or device should be apparent. In order to transmit power to the ground engaging wheel 116, the operator pivots the control handle 28 so as to shift the actuator rod 180 downwardly. This movement of the control member 28 rotates the ground engaging wheel shaft 112 through the clutch arm 130. The clutch arm 134 also rotates thereby moving the jackshaft 140 towards the ground engaging wheel 116 through the link 170. The bearing 144 supporting the end of the jackshaft 140 adjacent the side member 100 has sufficient play or slop in it to permit movement of the jackshaft 140 towards the ground engaging wheel. Also, the jackshaft 140 has inherent resilience which will permit this flexing about the bearing support so that the drive wheel 162 may contact the friction driven wheel. The jackshaft is positioned relative to the wheel shaft 112 so that the movement required to bring the drive wheel 162 into contact with the driven wheel is not very great.

The unique drive actuator possesses substantial advantages over the previously available devices. The main portions of the actuator are totally enclosed within the housing. The actuator rod 180 is preferably enclosed within the tubular upright portion 24 of the handle. As a result, the operative portions of the clutch mechanism or drive actuator are not exposed and damage to these devices during use is prevented. Also, enclosing the rod 80 prevents unintended actuation as a result of contact or entanglement with objects in the operating area. The overall structural arrangement is relatively simple when compared to some of the complex structures heretofore employed and is also reliable in use. Upon release of the control handle 28 by the operator, the biasing spring 212 acting against the flexible transmission member will pull the end of the jackshaft away from the ground engaging wheel. As a result, power is no longer transmitted to the ground engaging wheel 116 and the device will stop. However, when the drive is declutched or disengaged from the drive engaging wheel, the jackshaft 140 is still continuously rotated. As a result, the sweeper brush 82 will also be continuously rotated. If it is desired to shift the brush 82 so that it is no longer contacting the surface to be swept, a brush lift assembly is provided. The axle 80 of the brush is supported at the ends of a pair of arms 252 pivoted to the sides 100 of the housing 18. Extending upwardly from a point intermediate the ends off one of the arms 252 is a rod or link 254. The rod is pivoted at one end to the arm 252 and at the other end to a brush lift handle 256. The end of the brush lift handle 256 includes a yoke 258 and the rod 254 is connected to the yoke intermediate the ends of the yoke legs. As a result, when the brush lift handle 256 is raised upwardly the ends of the legs of the yoke are cammed against the top 102 of the housing assembly to thereby raise the rod 254 upwardly and shift the brush 82 upwardly out of contact with the surface. As seen in FIG. 1, a coil spring 260 extending from the sidewall of the housing 18 to the brush arm 252 suspends the brush for normal operation.

Although disclosed in the context of a self-propelled sweeper, it should be readily apparent that the unique drive actuator in accordance with the present invention may be employed in a wide range of self-powered apparatus. The device serves as a dead man-type actuator for the selective and intentional transfer of power from a power unit to a ground engaging or driven wheel. The actuator and drive transmission are usable either with the internal combustion engine 20 illustrated in FIGS. 1-3 or, as shown in FIG. 10, they may be employed with an electric motor 20′. Selective activation of the ground engaging wheel is provided while permitting continuous operation of driven implements such as the sweeper brush.

In view of the foregoing description, various modifications will undoubtedly become apparent to those of ordinary skill in the art without departing from the inventive concepts disclosed herein. For example, the friction drive wheels 162, 124 could be replaced with gears. Also, the flexible drive transmission member and the pulleys could be replaced with a chain drive and sprocket arrangement. Therefore, it is expressly intended that the above description should be considered as that of the preferred embodiment. The true spirit and scope of the present invention will be determined by reference to the appended claims.

The embodiments of the invention in which an exclusive property or privilege is claimed are defined as follows.

1. A drive actuator for a self-propelled device of the type including a power unit comprising:
    a frame;
    a wheel shaft supported at its ends for rotational movement on said frame;
    a ground engaging wheel rotatably mounted on said wheel shaft;
    a jackshaft rotatably mounted and supported at both ends on said frame in spaced relationship with said ground engaging wheel and for limited movement about one end thereof towards and away from said ground engaging wheel, said jackshaft being rotated by said power unit;
    linkage means interconnecting said wheel shaft and said jackshaft for moving said jackshaft towards and away from said ground engaging wheel upon rotation of said wheel shaft;
    drive means on said jackshaft for rotating said ground engaging wheel upon rotation of said wheel shaft and movement of said jackshaft;
    a handle supported by said frame and including a pivotally mounted portion movable between a first and second position; and
    actuator means at least partially enclosed within said handle and shifted by said pivotally mounted portion of said handle for rotating said wheel shaft when said handle portion is moved between said first and said second positions whereby said drive means rotates said ground engaging wheel.

2. A drive actuator for a self-propelled device of the type including a power unit comprising:
    a frame;
    a wheel shaft supported at its ends for rotational movement on said frame;
    a ground engaging wheel rotatably mounted on said wheel shaft;
    a jackshaft rotatably mounted on said frame in spaced relationship with said ground engaging wheel and for limited movement towards and away from said ground engaging wheel, said jackshaft being rotated by said power unit;
    linkage means interconnecting said wheel shaft and said jackshaft for moving said jackshaft towards and away from said ground engaging wheel upon rotation of said wheel shaft;
    drive means on said jackshaft for rotating said ground engaging wheel upon rotation of said wheel shaft and movement of said jackshaft;
    a handle supported by said frame and including a pivotally mounted portion movable between a first and second position; and
    actuator means shifted by said pivotally mounted portion of said handle for rotating said wheel shaft when said handle portion is moved between said first and said second positions whereby said drive means rotates said ground engaging wheel,
    said linkage means comprising:
    a clutch arm secured to said wheel shaft and extending radially therefrom.
    an arm supporting said jackshaft and extending radially therefrom, said arm being pivotally mounted at one end to said frame; and
    a link connected at one end to said clutch arm and at the other end to said arm.

3. A drive actuator as defined by claim 2 wherein said actuator means comprises:
    a rod having one end contacted by said handle portion when said handle portion is moved from said first to said second position; and
    another clutch arm secured to said wheel shaft and extending radially therefrom, the other end of said rod being pivotally connected to said another clutch arm.

4. A drive actuator as defined by claim 3 wherein said handle further includes a tubular portion extending upwardly from said frame, said pivotally mounted portion being pivoted to the top of said tubular portion, said rod extending upwardly within said tubular portion.

5. A drive actuator as defined by claim 4 wherein said drive means includes a friction drive wheel brought into frictional engagement with said ground engaging wheel upon movement of said jackshaft.

6. A drive actuator as defined by claim 5 wherein said ground engaging wheel includes a driven friction wheel secured thereto and dimensioned to be engaged by said friction drive wheel.

7. A self-propelled apparatus, comprising:
    a frame;
    a power unit mounted on said frame and having an output shaft;
    a handle including at least one leg secured to said frame at one end and a control member shiftably mounted to said leg at the other end;
    a wheel shaft supported on said frame for at least limited rotation;
    a ground engaging wheel rotatably mounted on said wheel shaft;
    actuator means interconnecting said control member and said wheel shaft for rotating said wheel shaft upon movement of said control member;
    a jackshaft;
    means for rotatably mounting said jackshaft on said frame and for allowing limited movement of said jackshaft towards and away from said ground engaging wheel;
    biasing means operatively connected to said jackshaft for biasing said jackshaft away from said ground engaging wheel;
    a drive member non-rotatably secured to said jackshaft and positioned to operatively engage said ground engaging wheel when said jackshaft is moved towards said ground engaging wheel;
    linkage means connecting said wheel shaft to said jackshaft for moving said jackshaft towards said ground engaging wheel upon rotation of said wheel shaft; and
    transmission means operatively connected to said power unit for transmitting power from said power unit to rotate continuously said jackshaft;

8. A self-propelled apparatus as defined by claim 7 wherein said actuator means comprises:

a first clutch arm non-rotatably secured to said wheel shaft and extending radially outwardly therefrom; and an actuator rod connected at one end to said first clutch arm and engaged at the other end by said control member, said actuator rod extending within said leg of said handle.

9. A self-propelled apparatus, comprising:
a frame;
a power unit mounted on said frame and having an output shaft;
a handle including at least one leg secured to said frame at one end and a control member shiftably mounted to said leg at the other end;
a wheel shaft supported on said frame for at least limited rotation;
a ground engaging wheel rotatably mounted on said wheel shaft;
actuator means interconnecting said control member and said wheel for rotating said wheel shaft upon movement of said control member;
a jackshaft;
means for rotatably mounting said jackshaft on said frame and for allowing limited movement of said jackshaft towards and away from said ground engaging wheel;
a drive member non-rotatably secured to said jackshaft and positioned to operatively engage said ground engaging wheel when said jackshaft is moved towards said ground engaging wheel;
linkage means connecting said wheel shaft to said jackshaft for moving said jackshaft towards said ground engaging wheel upon rotation of said wheel shaft; and
transmission means operatively connected to said power unit for transmitting power from said power unit to rotate said jackshaft;
said means for mouting said jackshaft comprising:
a first bearing mounted on said frame and rotatably supporting one end of said jackshaft; and
an arm assembly pivoted at one end to said frame and including a second bearing for rotatably supporting the other end of said jackshaft.

10. A self-propelled apparatus as defined by claim 7 wherein said linkage means comprises:
a lever arm non-rotatably secured to said wheel shaft and extending radially outwardly therefrom; and
a link connected at one end to said lever arm and at the other end to said jackshaft.

11. A self-propelled apparatus as defined by claim 7 wherein said transmission means comprises:
a driven pulley non-rotatably secured to said jackshaft;
an idler pulley arm pivotally mounted at one end to said frame;
an idler pulley rotatably mounted on said idler pulley arm;
an input pulley mounted on the output shaft of said power unit;
a flexible, endless transmission member reeved around said driven pulley, said idler pulley and said input pulley; and wherein said biasing means includes;
spring means for biasing said idler pulley arm into engagement with said transmission member.

12. A self-propelled apparatus as defined by claim 11 wherein said power unit comprises an internal combustion engine.

13. A self-propelled apparatus as defined by claim 11 wherein said power unit comprises an electric motor.

14. A self-propelled apparatus, comprising:
a frame;
a power unit mounted on said frame and having an output shaft;
a handle including at least one leg secured to said frame at one end and a control member shiftably mounted to said leg at the other end;
a wheel shaft supported on said frame for at least limited rotation;
a ground engaging wheel rotatably mounted on said wheel shaft;
actuator means interconnecting said control member and said wheel shaft for rotating said wheel shaft upon movement of said control member;
a jackshaft;
means for rotatably mounting said jackshaft on said frame and for allowing limited movement of said jackshaft towards and away from said ground engaging wheel;
a drive member non-rotatably secured to said jackshaft and positioned to operatively engage said ground engaging wheel when said jackshaft is moved towards said ground engaging wheel;
linkage means connecting said wheel shaft to said jackshaft for moving said jackshaft towards said ground engaging wheel upon rotation of said wheel shaft; and
transmission means operatively connected to said power unit for transmitting power from said power unit to rotate said jackshaft, said actuator means comprising:
a first clutch arm non-rotatably secured to said wheel shaft and extending radially outwardly therefrom; and
an actuator rod connected at one end to said first clutch arm and engaged at the other end by said control member,
said handle leg being tubular and said actuator rod extending within said handle leg.

15. A self-propelled apparatus as defined by claim 14 further including:
a handle bracket at the upper end of said handle leg, said bracket including a pair of spaced walls defining a slot;
a control member pivot bracket receiving an end of said control member and disposed in said slot, said pivot bracket including a first and second spaced aperture;
a pivot pin extending through said spaced walls and said pivot bracket first aperture; and
a removable, control member release pin extending through said walls and said second aperture, whereby upon removal of said release pin said control member may be pivoted downwardly for storage and transport.

16. A self-propelled apparatus as defined by claim 15 wherein said means for mounting said jackshaft comprises:
a first bearing mounted on said frame and rotatably supporting one end of said jackshaft; and
an arm assembly pivoted at one end to said frame and including a second bearing for rotatably supporting the other end of said jackshaft.

17. A self-propelled apparatus as defined by claim 16 wherein said linkage means comprises:

a lever arm non-rotatably secured to said wheel shaft and extending radially outwardly therefrom; and a link connected at one end to said lever arm and at the other end to said arm assembly.

18. A self-propelled apparatus as defined by claim 17 wherein said transmission means comprises:

a driven pulley non-rotatably secured to said jackshaft;

an idler pulley arm pivotally mounted at one end to said frame;

an idler pulley rotatably mounted on said idler pulley arms;

an input pulley mounted on the output shaft of said power unit;

a flexible, endless transmission member reeved around said driven pulley, said idler pulley and said input pulley; and spring means for biasing said idler pulley arm into engagement with said transmission means.

* * * * *

UNITED STATES PATENT AND TRADEMARK OFFICE
CERTIFICATE OF CORRECTION

PATENT NO. : 4,108,268
DATED : August 22, 1978
INVENTOR(S) : Thomas S. Block

It is certified that error appears in the above-identified patent and that said Letters Patent are hereby corrected as shown below:

Column 9, line 19:

after "wheel" (first occurrence) insert --shaft--.

Signed and Sealed this

Third Day of July 1979

[SEAL]

Attest:

Attesting Officer

LUTRELLE F. PARKER
Acting Commissioner of Patents and Trademarks